US005585160A

United States Patent [19]

Østhassel

[11] Patent Number: 5,585,160

[45] Date of Patent: Dec. 17, 1996

[54] FLUORESCENT FOIL

[75] Inventor: Henry G. Østhassel, Vanse, Norway

[73] Assignee: NeoSign AS, Norway

[21] Appl. No.: 175,434

[22] PCT Filed: Jun. 23, 1992

[86] PCT No.: PCT/NO92/00111

§ 371 Date: Jan. 7, 1994

§ 102(e) Date: Jan. 7, 1994

[87] PCT Pub. No.: WO93/01581

PCT Pub. Date: Jan. 21, 1993

[30] Foreign Application Priority Data

Jul. 10, 1991 [NO] Norway .................................. 912701

[51] Int. Cl.[6] .................................................. B32B 3/02

[52] U.S. Cl. ............................ 428/66.5; 40/539; 40/541; 40/542; 40/543; 40/546; 40/594; 40/595; 428/220; 428/354; 428/542.2; 428/690

[58] Field of Search ............................... 428/38, 64, 220, 428/354, 343, 690, 691, 542.2; 40/543, 542, 546, 541, 559, 594, 595; 250/365, 372, 402.1; 362/812

[56] References Cited

U.S. PATENT DOCUMENTS

| | | | |
|---|---|---|---|
| 3,839,171 | 10/1974 | Akamatsu | 204/159.15 |
| 3,944,637 | 3/1976 | Bond | 264/1 |
| 4,477,521 | 10/1984 | Lehmann | 428/336 |
| 4,519,154 | 5/1985 | Molari | 40/615 |
| 4,544,586 | 10/1985 | Molari | 428/29 |
| 4,935,279 | 6/1990 | Perko | 428/74 |

FOREIGN PATENT DOCUMENTS

| | | |
|---|---|---|
| 902755 | 6/1990 | Norway . |
| 86/03045 | 5/1986 | WIPO . |
| 89/02637 | 3/1989 | WIPO . |
| 91/20070 | 12/1991 | WIPO . |

*Primary Examiner*—Nasser Ahmad

*Attorney, Agent, or Firm*—Andrus, Sceales, Starke & Sawall

[57] ABSTRACT

A fluorescent foil is formed from a translucent/transparent foil material having admixed therewith coloring matter and fluorescent matter. A translucent layer substantially impermeable to ultraviolet rays is provided on one side of the foil material. A translucent adhesive layer is also applied to the fluorescent foil, preferably to the translucent ultraviolet barrier layer. A sign board is formed on translucent/transparent substrate by attaching fluorescent foils so formed to opposite sides of the substrate. The translucent foils have different colors and are cut to the form of letters, figures, logograms, emblems, etc. in a complementary manner. The sign board may be illuminated by ultraviolet light from either or both sides to provide an attention getting, multicolor display.

3 Claims, 3 Drawing Sheets

FLUORESCENT FOIL

BACKGROUND OF THE INVENTION

1. Field of the Invention

This invention relates to a fluorescent foil, especially for use within the sign and advertising trade.

In one field of application for such fluorescent foils within the sign and advertising trade, the foil is cut to letters and/or figures, emblems, logograms and the like which are adhered onto e.g. a window pane or a corresponding disc or plate of glass, plexiglass or similar transparent/translucent materials which thereby constitutes a carrier for the sign/advertisement. In order to give the sign/advertisement the desired glowing neon-like effect, the same must be illuminated by means of so called invisible or black light.

2. Description of the Related Art

There exists adhesive fluorescent foils of this kind. These known sign/advertisement-foils are white and non-translucent. At one side face thereof, a layer of fluorescent matter has been applied to these foils, the opposite side face carrying an adhesive layer having an external protective paper layer to be torn off and which serves to protect the adhesive layer prior to the time of use.

When adhered onto e.g. a glass or plexiglass pane, these known foils in the form of letters and/or figures will exhibit a front face (the external surface of the fluorescent layer) and a rear side (the interface between the adhesive layer and the adjacent pane face), the intermediate, carrying, white and non-translucent foil layer preventing illumination through the layers when said front face is illuminated by black light. The sign and/or advertising letters etc. have the very same shape as seen from said rear side, but an attractive "advertising effect" cannot be obtained there, this representing an obvious disadvantage in the fields of application concerned.

Likewise, it represents a serious disadvantage and a limitation of use that the illuminating source for black light must be positioned at that side to which the fluorescent layer is facing. With such an external or outdoor positioning of the light source, the latter is subjected to theft and wilful damage, and the placement of such signs and/or advertisement on cars is practically out of the question. With outdoor sign/advertisement, the absolutely necessary external positioning of the fluorescent layer will cause its deterioration, wearing and damage through external influences, such as the sun, weather and wind.

These deficiencies, disadvantages and application limitations in adhesive fluorescent sign/advertisement-foils are in so far remedied to a certain degree by means of a foil of the kind concerned made of a translucent foil material admixed colouring matter and fluorescent matter. Such a foil is disclosed in Norwegian patent application No. 902755 (not published).

Nevertheless, the adhesive fluorescent foil according to Norwegian patent application No. 902755 has application limitations and, thus, cannot be used to create special decorative effects such as when adhering two corresponding mirror-symmetrical overlapping foil letters/figures, one at each side of a glass or plexiglass pane—the two mirror-symmetrical letters/figures being given a different colour, and wherein one may alternate between the colours singly and in combination through alternating illumination from two illumination sources for black light, one at each side of said pane.

The fluorescent foil according to Norwegian patent application No. 902755 is not protected against UV-radiation; this shortens its useful life substantially.

SUMMARY OF THE INVENTION

Therefore, the object of the present invention is to provide a fluorescent foil of the kind concerned wherein disadvantages, deficiencies and application limitations of prior art technique generally and the technical teachings of Norwegian patent application No. 902755 specially are eliminated or reduced in a decisive degree, as well as additionally providing fluorescent foils usable for a wide variety of purposes within the trade concerned, thereby achieving very attractive and surprisingly decorative and illustrative effects.

In accordance with the invention, said objects are realized by employing a fluorescent foil made from a translucent/transparent foil material having mixed therewith coloring matter and fluorescent matter. The foil is provided, at least on one side thereof with a translucent layer which is impermeable or substantially impermeable to ultraviolet rays.

A translucent layer impermeable or substantially impermeable to UV-radiation is placed between the fluorescent foil and a translucent adhesive layer.

The invention also comprises a signboard, e.g. a name or advertising signboard comprising a translucent disc having at both sides attached fluorescent foils formed according to the invention, and having different colour or colours at the two sides, as well as being cut to letter, figure or other constituents (components, parts), which at one side of the translucent disc are attached in a correct orientation, while the cooperating/completing letter, figure or other constituents in opposed positions at the other side of the translucent disc are attached in a mirror-symmetrical relationship to the first-mentioned letter constituents etc.

The substantial novel technical effect obtained by means of the present invention consists in that it, by means of the fluorescent translucent coloured foils cut in the form of letters, figures, emblems, logograms etc., makes possible their neon-like glowing in different colours at different times, so that particularly conspicuous advertising-technical effects are achieved, said effects—apart from the alternating colors—give a three-dimentional effect wherein the apparent depth far exceeds the thickness of the foils plus the glass or plexiglass pane/disc they have been adhered to. These effects will be further explained in connection with the following description when reference is made to illustrative drawing figures.

A very important side effect with the fluorescent foil according to the invention consists in its substantially prolonged useful life in association with advertisements constantly being subjected to sun beams; a useful life corresponding to several times that of an ordinary foil being obtainable, this being due to the fact that the foil at least at one side is provided with a translucent layer impermeable or substantially impermeable to ultraviolet rays.

BRIEF DESCRIPTION OF THE DRAWING

Examples of the embodiment and use of the subject matter of the invention are defined in the following with reference to the accompanying drawings, wherein.

DESCRIPTION OF THE PREFERRED EMBODIMENTS

Figure 1:
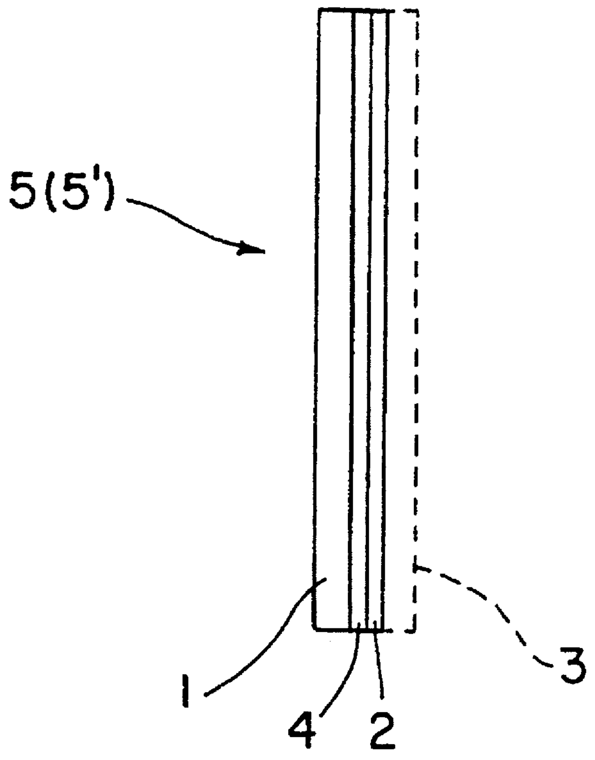
FIG. 1 shows a greatly enlarged partial view of a foil according to the invention, as seen toward one side edge.

With reference to FIG. 1, reference numeral 1 denotes a fluorescent foil, especially of the kind made from a translucent foil material having admixed therewith colouring matter and fluorescent matter. To one side of the foil, a translucent/transparent adhesive layer 2 has been applied. A tear-off socalled backing paper 3, e.g. of silicone paper, serving to protect the adhesive layer 2 prior to the actual use thereof and of the foil 1, is, for a illustrative purpose, shown in dotted lines.

In accordance with the present invention, a translucent/transparent layer 4 has been placed between the foil 1 itself and the adhesive layer 2, said layer 4 e.g. consisting of benzotriazole or benzophone, and being impermeable or substantially impermeable to ultraviolet rays, the main purpose and side effects of which being described in the following in connection with FIG. 2 in association with FIG. 3. In the following, the layer 4 will—due to the above-mentioned properties thereof—be called a UV-barrier layer.

The material of the UV-barrier layer 4 is not critical for the present invention and the desired properties thereof, namely to prevent passage of ultraviolet rays or to prevent substantial penetration of such rays, respectively, may in principle be achieved by means of filter materials and/or by means of ultraviolet absorption means available on the market in many translucent/transparent types based on stopping, filtration and/or absorption.

Figure 3:
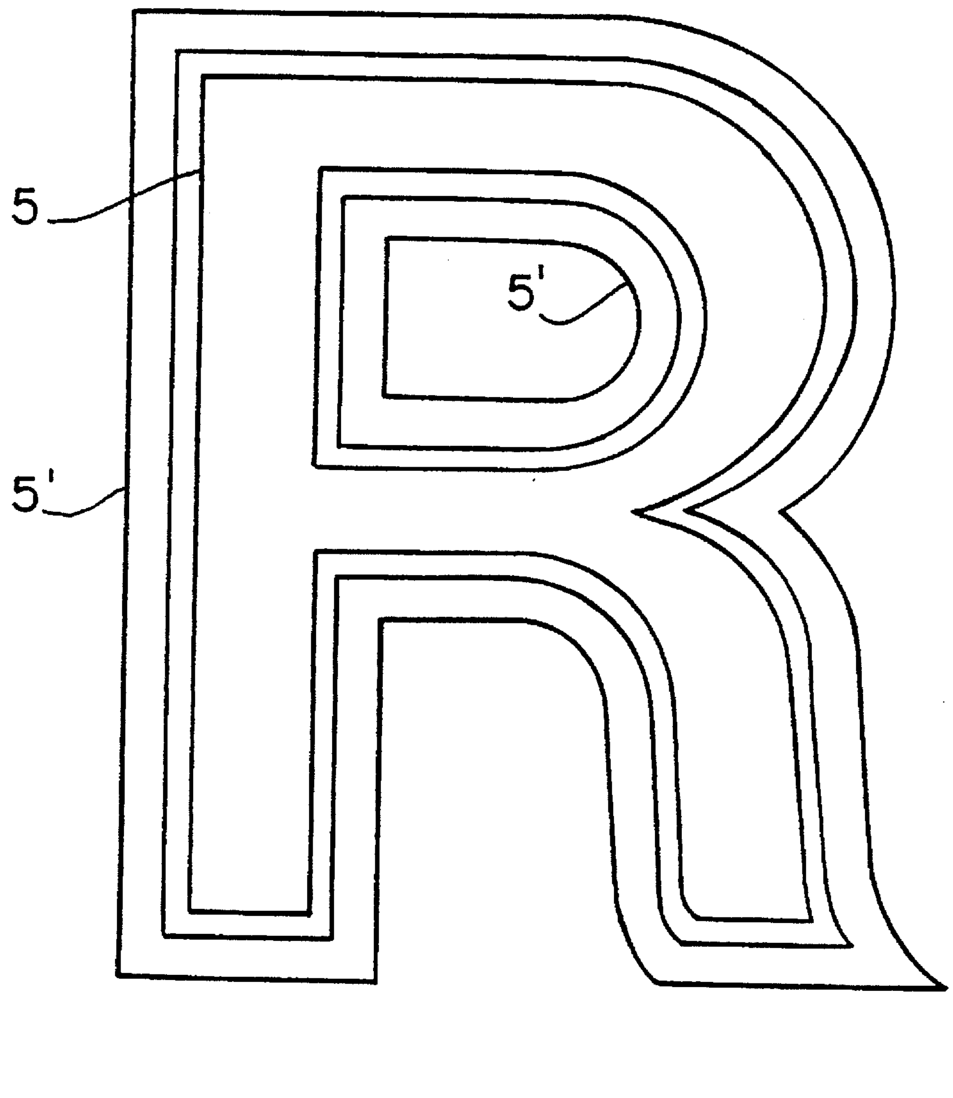
FIG. 3 shows a stylistic R cut from two differently coloured foils in accordance with the invention, wherein the inner letter core itself, which in per se represents an entire letter, is adhered onto one side of a glass or plexiglass disc/pane, the internal and external R-contour portions, which per se represent an entire letter, are adhered onto the opposite side of said disc or pane in mirror-symmetrically opposing positions, surrounding the R-core.

Now, reference is made to FIG. 3.

Because the letter R shown is composed of two foils having different colour, the two foils from which the letter portions have been cut, are denoted 5 and 5', respectively.

The internal and external R-contour portions 5' in correctly facing positions (with regard to the backing paper 3) may e.g. be made from a red-coloured foil according to FIG. 1, while the R-core 5 may have a blue colour and take a mirror-symmetrical position relative to the R-contour portions 5'.

Figure 2:
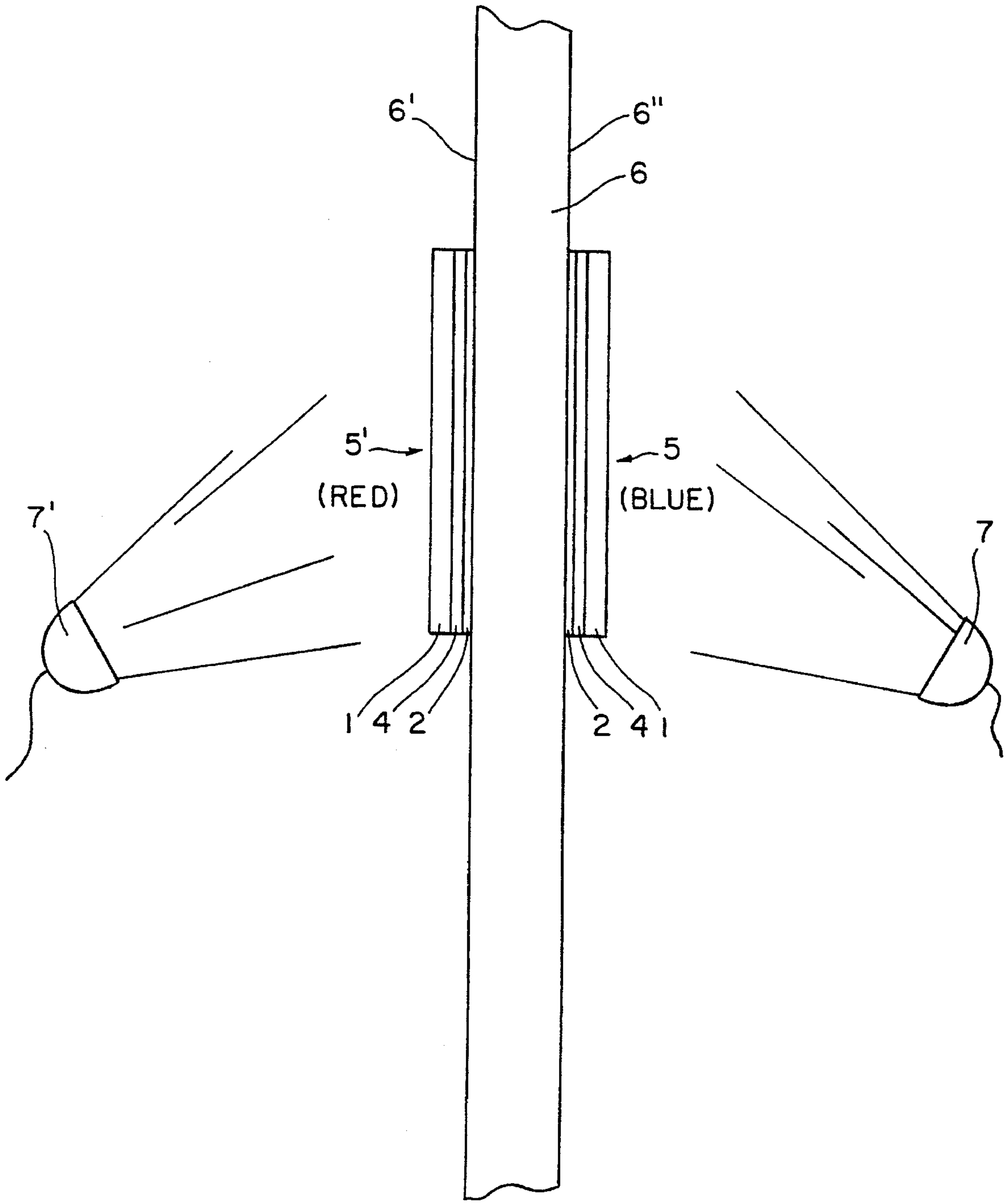
FIG. 2 shows on the same enlarged scale as well as seen toward one side edge a partial view of a glass/plexiglass disc which e.g. may constitute a name and/or advertisement signboard according to the invention or a fixed (window) pane, wherein two sets of identically shaped foil letters, figures or the like having different colours have been adhered in mirror-symmetrically opposing, partly overlapping positions.

Reference is now made to FIG. 2 in connection with FIG. 3.

In FIG. 2, reference numeral 6 denotes a disc of translucent/transparent material and which may be incorporated as a carrying member in e.g. a name and/or advertisement signboard, or which may be constituted by a window pane or similar glass or plexiglass pane in a building, a vehicle etc.

The R-contour foil portions 5' having the assumed red colour are, according to FIG. 2, adhered onto one side 6' of the glass disc/signboard 6, while the R-core foil piece 5 having the assumed blue colour are adhered onto the opposite side 6" of the glass disc/signboard 6 in such a manner that the stylistic R-letter, as seen toward the side 6' of the signboard/glass disc 6, appears as illustrated in FIG. 3 (opposing letter pieces 5,5' wherein 5 is facing mirror-symmetrically in relation to 5', the letter pieces 5' surrounding the letter piece 5).

Two known light sources 7,7' for the generation of black light and illumination of the fluorescent foils 5,5', are placed one at each side of the glass disc/signboard 6.

When both these light soruces 7,7' are on, each illuminating a foil letter 5 or 5', respectively, of its own, with black light, i.e. the signboard/glass disc 6 is being illuminated from opposite sides, both foil pieces 5,5' will glow neon-like, but in a different colour (blue and red, respectively).

As black light sources 7,7', several different kinds may be used, e.g. projectors, search-lights, fluorescent lamps etc.

Fluorescent foils 5,5' having UV-barrier layer 4, or name and/or advertisement signboards, respectively, based on such foils, render possible very special advertising-technical effects:

One assumes that the projectors, search-lights etc. 7,7' for black light according to FIG. 2 are coupled to an electrical time-lag relay adapted to be activated/deactivated in accordance with a certain program, using technology known per se.

In an elucidating example, one takes as a starting-point a time of 9 seconds starting with said relay activating light source 7', which illuminates the signboard/glass disc 6 in the direction toward the outer face 6', thereby bringing the red colour of the fluorescent foil 5' to glow neon-like. Because of the UV-barrier layer 4 of the foil 5, the blue colour of the foil 5 will not be activated. This condition may e.g. last for 2 seconds.

After the expiry of said 2 seconds, the time-lag relay is adapted to disconnect the light source 7' and to connect the light source 7, the latter than bringing the blue colour of the fluorescent foil 5 to glow neon-like. Because of the UV-barrier layer 4 of the foil 5', the red colour of the fluorescent foil 5' will not be activated. This condition also may last for 2 seconds.

The time-lag relay may thereafter be adapted to connect both light sources simultaneously, activating both foils 5,5' at the same time and giving maximum advertising effect having a three-dimensional special effect far exceeding the actual total thickness of the two foils 5,5' and the glass disc 6. Within this time-controlled program a pause of 2 seconds may thereafter be incorporated, no illumination whatsoever taking place. Then, the above-mentioned "variation" time of 9 seconds is terminated. Such a periodical alternating between single colours/letter portions and two-colour combination may take place according to a 24 hours program of operation.

Adhesive fluorescent foils cut to letters, letter combinations, figures, logograms, emblems etc. are always illuminated in the direction toward the fluorescent layer of colouring matter.

In signboards made in accordance with the invention, the mutually opposing differently coloured foil pieces 5,5' adhered onto opposite sides of a disc-like translucent/transparent carrying signboard element 6 will ordinarily have the form of letter and/or figure constituents completing each other or cooperating in one way or the other, especially when the two foil pieces 5,5' are illuminated simultaneously. However, if one disregards the momentary effect, there is also achieved over a certain time (e.g. 9 seconds) a cooperating completing effect of a great advertising value (attracts great attention due to its originality and aesthetically attractive "radiation").

I claim:

1. A sign board capable of producing multi-color visual effects upon exposure to ultraviolet light, said sign board comprising:

a substrate capable of transmitting visible light and having a pair of opposing surfaces;

a first fluorescent foil applied to one surface of said substrate, said first fluorescent foil comprising a first base foil having first and second opposing sides, said first base foil being formed of a light transmitting material having admixed therein coloring matter of a first color and matter that fluoresces when subjected to ultraviolet light to produce visible light, said first base foil having a first layer applied to said second side thereof coextensively with said first base foil, said first layer comprising a material that transmits visible light but is substantially impermeable to ultraviolet light, said first fluorescent foil being cut to a given shape and being applied to said one surface of said substrate to occupy a given area on said one surface of said substrate, said first fluorescent foil being applied with said first layer between said first base foil and said substrate and with said first side of said first base foil exposed;

a second fluorescent foil applied to the other surface of said substrate, said second fluorescent foil comprising a second base foil formed of a light transmitting material having admixed therein coloring matter of a second color and matter that fluoresces when subjected to ultraviolet light to produce visible light, said second fluorescent foil having a second layer applied to said second side thereof coextensively with said second base foil, said second layer comprising a material that transmits visible light but is substantially impermeable to ultraviolet light, said second fluorescent foil being cut to a shape complementary to said given shape of said first fluorescent foil and being applied to said other surface of said substrate so as to have a desired relationship to said first fluorescent foil when said sign board is viewed toward a given one of said surfaces, and so as to occupy a given area on said other surface of said substrate, the given shape and application of said second fluorescent foil being such that said second fluorescent foil occupies a given area on said other surface of said substrate not occupied by a projection of said given area of said first layer onto said other surface, and the given shape and application of said first fluorescent foil being such that said first fluorescent foil occupies a given area on said one surface of said substrate not occupied by a projection of said given area of said second fluorescent foil onto said one surface of said substrate so that said first and second layers are offset, said second fluorescent foil being applied to said substrate with said second layer between said second base foil and said substrate and so that said first side of said second base foil of said second fluorescent foil is exposed;

whereby said sign board can selective produce visible light of only said first color, of only said second color, or of both said colors by, respectively, exposing said first substrate surface, said second substrate surface, or both said substrate surfaces to ultraviolet light, thereby to produce said multi-color visual effects, the light of said first, second, or both colors being visible when said sign board is viewed toward either of said surfaces of said substrate.

2. The sign board according to claim 1, wherein at least one of said first and second layers is comprised of one of benzotriazole and benzophenone.

3. The sign board according to claim 1 wherein at least one of said first and second fluorescent foils further includes a layer of light transmitting adhesive, said adhesive layer being located intermediate the respective one of said first and second layers and the respective one of said one or the other surfaces of said substrate.

* * * * *